Aug. 22, 1961     C. J. LOECHL     2,996,811
GYPSUM WALLBOARD MANUFACTURE
Filed May 9, 1957
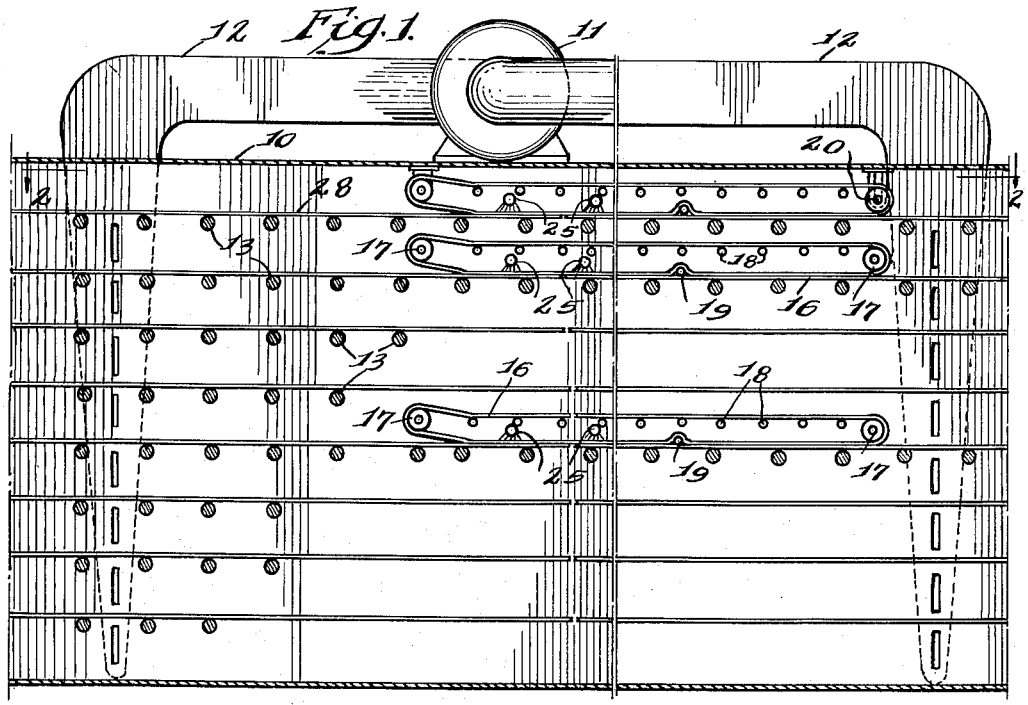
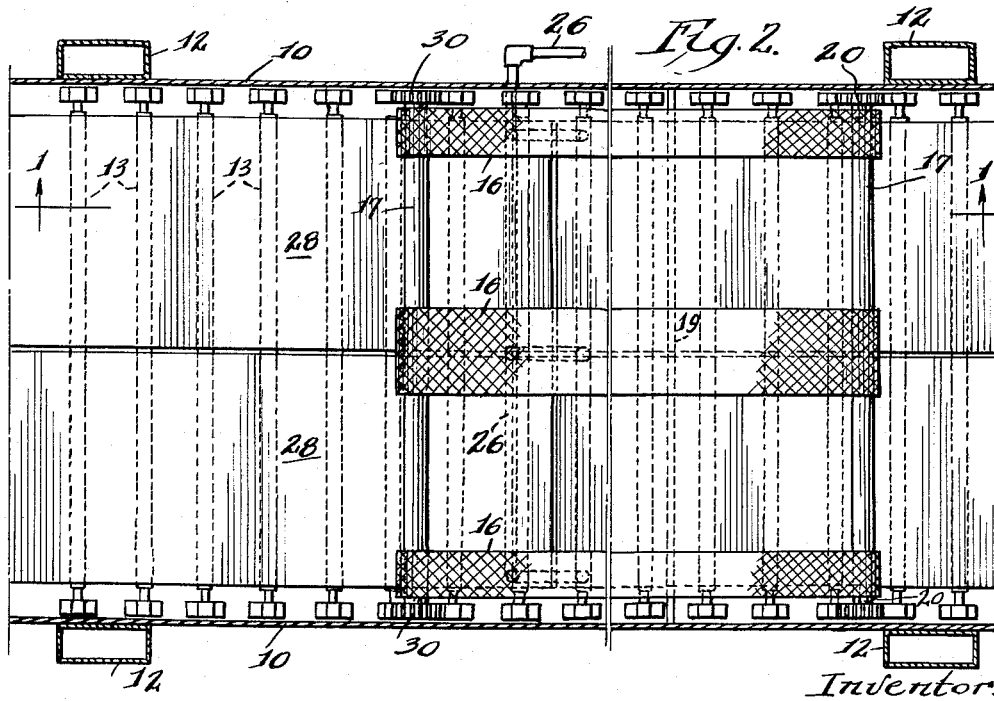
Inventor.
Clarence J. Loechl
By. Edw. A. Hampson
Attorney

2,996,811
GYPSUM WALLBOARD MANUFACTURE

Clarence J. Loechl, Arlington Heights, Ill., assignor to The Celotex Corporation, Chicago, Ill., a corporation of Delaware Filed May 9, 1957, Ser. No. 658,166
2 Claims. (Cl. 34—205)

This invention deals with a phase of the manufacture of gypsum wallboard.

The production of gypsum wallboard involves the deposit of gypsum slurry on a paper sheet and the subsequent application of a second paper sheet over the deposited slurry followed by a forming or shaping operation, drying, and finally subdivision of the continuously produced sheet into suitable lengths for use.

This invention deals in particular with the drying phase of the production of gypsum wallboard. So far as is known, all of the manufacturers of gypsum wallboard utilize multiple deck driers or kilns in which lengths of the formed and set gypsum board travel through the drier on roller conveyers, the driers generally be eight decks high, that is, having eight superimposed and spaced sets of conveyer rolls on which strings of gypsum board are conveyed through the drier for drying.

The initially formed and set gypsum board contains a considerable excess of water over that required for the rehydration of the gypsum slurry comprising the core. As the core sets the water for rehydration is utilized in this chemical reaction but there is still an appreciable excess of water partially within the set gypsum core and partially absorbed in the paper facings.

These driers are of the same general construction, generally divided into drying zones, usually four in number, and each of which has its separate circulating system for supplying heated air to and withdrawing this air from the respective ends of each zone. As average figures, it may be assumed that the temperatures at the entry and exit ends of these zones, respectively, are about as follows:

| | ° F. |
|---|---|
| First zone | 525 to 475 |
| Second zone | 500 to 450 |
| Third zone | 450 to 400 |
| Fourth zone | 300 to 250 |

It will be seen that throughout the length of the drier, covering the range of 525° F. at the entry end of the drier to the temperature of 250° F. at the exit end, that such temperatures are sufficiently high to cause calcining of gypsum. Due to the fact that a considerable quantity of water is being evaporated from the board during the greater part of its period of passage through the length of the drier, the temperature of the board is consequently prevented from rising to such temperature as will cause recalcining of the gypsum of the core, and thus it is possible to maintain the relatively high temperatures referred to for accelerating the evaporation of the excess water from the gypsum board.

It will, of course, be understood that lower temperatures could be used, but this would require a greater time for the drying of the gypsum board which is, of course, detrimental in commercial production of the product. Accordingly, every effort is made to maintain high drying temperatures, just as high as possible, so as to obtain a high rate of drying in the drier, but in connection with the utilization of the relatively high drying temperatures, a serious difficulty is encountered. Gypsum wallboard is ordinarily manufactured in 4' widths, and in order to match the board-forming capacity of the board-forming end of the production line, it is usual that the driers are not only provided with eight decks, but usually each deck is of a width to carry two 4' wide boards side-by-side.

It will be obvious that the edges of the gypsum boards being dried are subjected to much more severe drying conditions than are those portions of the board inwardly from its edges. At an edge, drying occurs not only from the bottom face and the top face, but additionally from the edge face, so that the drying or evaporation of moisture is appreciably more rapid from the edge portions of the board than from the center of the board or portions inwardly from its edge portions. In the time interval required for drying the center portion of the boards, that is, that portion inwardly from the edge portions, due to the more rapid evaporation from the edge portions of the board the edge portions normally are dried before the center portion of the board is dried. When this occurs the edge portion of the board, at the temperatures maintained within the drier, tends to or begins to recalcine, that is, the chemically bound water begins to be driven off and the edge portions of the board may be recalcined to the extent that they are appreciably softened and weakened, which is an extremely undesirable condition.

This invention is particularly directed to a drier construction to provide protection to the edge portions of the gypsum boards being dried therein, to reduce the rate of evaporation from the edge portions of the board to be equal to the rate of evaporation from the center portion of the board, or that portion of the board inwardly from the edge portions.

The desired protection is obtained by incorporating within the drier, in association with each conveyor deck thereof, a belt device so arranged and constructed that a belt member is laid down on the upper surface of a board along its edge portion to travel with the board as it travels through the drier, and thus to reduce the overall rate of evaporation from the edge portions of the board so that the rate of evaporation of the edge portion is equal to the rate of evaporation of the central portion of the board, with the result that the edge portion is prevented from drying before the central portion is dried, and, of course, the entire drying operation is so designed and operated that when the board is dried it is at the exit end of the drier and discharges therefrom and accordingly recalcining does not occur.

The protective belt member just above referred to must, of course, be comprised of a suitable material which can withstand the temperatures within the drier, the temperatures to which it will be subjected being at the maximum about 500° F., and such may be of suitably reinforced asbestos belting or high-temperature resistant synthetic rubber, or other material which may be available and has capacity of withstanding such temperatures. The specific material of the protective belt is not of the essence of the invention hereof since substantially any type of belting will serve for the desired functioning thereof, at least for a short period, so that other than for the economics of production, belting therefor which will stand up under the high temperatures of operation is not essential to the inventions hereof.

The protective belt will in most cases be positioned over each conveyer deck, as referred to, will be preferably about six to eight inches wide, positioned over the path which is followed by the edge of the wallboard, and will extend from about the middle of the drier to or substantially to the exit end thereof. Since a single belt of the length indicated would probably present difficult maintenance problems, it will, of course, be understood that such may comprise a plurality of successive belts which together make up a substantially continuous protective belt of approximately half the length of the drier. Since the conditions of operation of driers, of course, differ somewhat, the exact position of the protective belt for protecting the edge portions of the board being dried may vary somewhat—in one drier it may be necessary that the protection be applied to the edge portion of the board, say, at one-third the distance from the entrance end, whereas in another drier it may not be necessary to provide the protection for the edge of the board until the board has traveled substantially half way through the drier. Accordingly, it is to be understood that the exact position of the belt lengthwise of the drier and the exact length of the belt are subject to determination in accordance with the specific requirements of a specific drier in accordance with the conditions under which it operates and which conditions will vary somewhat from drier to drier.

The general subject of the inventions hereof having been above pointed out in some detail, it is the particular object of this invention to provide protection for the edge of a gypsum wallboard being dried in a production drier, whereby the evaporation of moisture from the edge portion of the board is equalized with the rate of evaporation of moisture from the center portion of the board, that is, the portion of the board inwardly from its edge portions. An additional object of the invention hereof is the provision of specific structure for accomplishing the principal objective, and still other objectives of the invention which will be apparent on reading the following description when considered in conjunction with the accompanying drawings.

In the drawings, FIG. 1 is a vertical section of a gypsum wallboard drier taken on line 1—1 of FIG. 2; and FIG. 2 is a horizontal section of a gypsum wallboard drier taken on line 2—2 of FIG. 1.

In the accompanying drawings, the showing is schematic or diagrammatic, no attempt at all being made to thereby disclose a production drier as such is ordinarily utilized in gypsum board manufacturing plants.

It is considered that the schematic presentation of the drawings clearly illustrates the structure so that the inventions hereof may be readily understood by those skilled in the gypsum wallboard art, whereas, on the other hand, such does not include much minor and unimportant detail which would be involved were the invention disclosed in a pictorial showing of a wallboard drier as used in the production of the product.

The drier housing or casing 10 is substantially merely an elongated tunnel-form structure for confining the drying air stream about the conveying structure on which the gypsum wallboard is conveyed through such tunnel-form structure comprising the drier.

A gypsum wallboard drier is ordinarily zoned into four zones of drying, and it will be understood that each such zone has its independent system for circulating the drying medium through the tunnel-form enclosing structure. For each of these zones there is provided a fan or blower 11 with suitable duct work 12 which from the pressure side of the fan, feeds the drying air to the higher temperature end of a zone, whereas the air from the other or lower end of such zone is exhausted due to the suction at the intake of the fan whereby circulation of the drying medium is maintained through the zone of the drier with the circulation being in the direction of travel of the board through the drier. It will, of course, be understood by those skilled in the art that in such drying medium circulating system, fan 10 and ducts 11, there is provided means for heating the circulating medium and also means for exhausting from such system a portion of the returning moisture-laden medium and the admission of such necessary additional fresh air into the system as may be required to maintain the desired drying cycle. Since such features are common to substantially all driers which dry by the circulation of heated air as a medium, and therefore are well understood, no attempt has been made to illustrate such features in the drawings in order that the drawings may be simplified as much as possible.

Inside the tunnel-form drier housing 10, for drying gypsum wallboard, there are normally provided eight spaced drier decks, each of which comprises a line of horizontal rolls extending across the width of a drier, the eight sets or decks being suitably spaced vertically within the drier housing. In the drawings the rollers comprising the drier decks are identified by numeral 13. While it is of no importance in connection with the disclosures of the inventions hereof, it is, of course, to be understood that the gypsum board to be dried is suitably fed to the various decks of the drier, ordinarily being so fed by a tipple which moves down and up, step by step, to successively feed the various decks of the drier with the board as it progresses from the preceding portion of the gypsum wallboard producing apparatus where the board is produced by well known procedures. The driers are usually of such width that on each deck two strings of the usual wallboard, four feet in width, are carried through the drier in parallel and side by side relation. This particular feature is relatively immaterial in connection with the inventions hereof, and it is to be understood that the inventions hereof are applicable to the drier of the type particularly described whether such has but a single deck on which the board passes through the drier or whether on which there is but one string of board to be dried, or a plurality of side by side strings of board.

As was mentioned above, due to the fact that there is more surface of the board at its edges exposed to the drying effect of the drying medium, it results that the edges of boards as they pass through the drier tend to dry out more rapidly than that portion inwardly from the edges, and that the particular purpose of the inventions hereof is that of providing means for reducing the evaporation from the edges of the board being dried so that the rate of evaporation from the edge portions of the board is the same as the rate of evaporation from those portions of the board inwardly from the edges thereof.

For protecting the edges of the boards in the driers so that the edges may not be dried more rapidly than those portions of the boards inwardly from the edges thereof, there is provided in association with each deck of the drier a protective belt member 16 running at its ends over suitable rolls 17, the upper run of which may be suitably supported by a series of small rollers 18. If desired, the lower run of such belt may be supported by one or possibly several supporting rolls 19. It may be advisable in some instances to use a support roll such as 19 to support the bottom run of belt 16 since the belt will be quite long, and one, two or three of such support rolls for the lower run of the belt may assist in preventing this long belt from draping down between conveyer rolls 13 in case a continuous string of wallboard is not being carried through on the board conveyer under a particular belt. Belt 16 is installed in relation to a drier deck so that through substantially its entire length it is positioned above and parallel to the rolls of a drier deck throughout its length, and in such relation that the lower run of the belt will rest on board being carried through the drier on the deck with which the particular belt is associated. As indicated, however, it is preferable that the forward end of the belt, or that end toward the hot end of the drying zone, be raised slightly with respect to the remainder of the run of belt 16, and accordingly the forward belt roll will be normally positioned at slightly greater height above the level of a drier deck than will be the belt roll at the other end of the belt. By raising the front end of the protective belt structure it will be understood that in case two successive boards on the deck should somehow inadvertently overlap somewhat, they may readily pass under the slightly elevated belt roll at the forward end without jamming or crushing. Preferably, belt roll 17 at the far or cooler end of belt 16 is mounted in vertically yieldable bearings whereby, should overlapping boards arrive at this point, as they pass under this roll 17 it may give sufficiently to prevent crushing or jamming due to such overlapping of successive boards. The bearings of such belt roll 17 at the far or cooler end of the belt run is indicated as mounted in vertical guides 20 between which the bearing for the roll may ride upwardly in case of a happening as referred to.

In a drier through which two strings of gypsum wallboard are advancing side by side on a deck there will be normally provided three belts 16, the outer edge belts being about from six to ten inches in width and extending slightly beyond the outer edge of the line of board passing through the drier. Centrally of the drier, where the inner edges of the boards passing through the drier are substantially in abutment or but slightly spaced, there is provided a belt which normally would be from about eight to twelve or fourteen inches in width and which, consequently, will overlap the inner edge of each board inwardly by about four to six or seven inches. It will be readily understood that since the lower runs of belts 16 rest on the upper faces of the boards passing through the drier, along their edge portions that consequently the circulating drying medium is prevented from contacting the surfaces of the boards over those portions which are covered by the lower runs of the belts 16, and that as a consequence evaporation of the moisture content of the boards along the edge portions is reduced, and by suitable design in accordance with the characteristics of a specific drier, that the evaporation along the edge portions may be reduced thereby to an extent so that the evaporation along the edge portions is not greater than the rate of evaporation from those portions of the board inwardly from the edge portions and as a consequence drying across the entire width of the board may be caused to be uniform.

Belt 16, when its lower run is resting on the upper surface of boards 28 being conveyed through the drier, will be propelled due to the friction between the contacting surfaces. It may, however, be deemed advisable that belt 16 be positively driven, in which case a suitable gear or sprocket or other drive device 30 may be mounted on or attached to the shaft of the belt roll 17 so that the belt roll 17 and belt may be driven at the same speed as the conveyers in the drier by drive means interposed between member 30 and the conveyor drive. Such drive is, of course, conventional and accordingly the detail thereof has not been illustrated in the drawings.

In case additional cooling is desired along the edges of the boards being conveyed through the drier in addition to the protection against heating, which is afforded by belt member 16, there may be mounted adjacent to each belt 16 suitably spray heads or nozzles 25 which may be mounted between the runs of the belt 16, as illustrated in the drawing, or substantially as desired so long as in proximity to belts 16. These nozzles may be supplied with cooling fluid by suitable piping 26. The nozzles 25 are preferably the so-called "fogging" nozzles from which the cooling fluid issues in extremely small droplets so that the fluid issues substantially as a fog. The evaporation of the cooling fluid from the belt surfaces and in the atmosphere immediately adjacent the edges of the board 28 being conveyed through the drier will absorb a considerable amount of heat in the conversion of the fluid from fluid to vapor form, and accordingly adjacent the edges of the boards the surrounding temperature will be lowered with respect to the temperature in the drier of those portions of the circulating drying medium not closely adjacent to the board edges where the cooling effect referred to is substantially localized.

In the foregoing description there has been set out in detail an apparatus to effect a reduction in the rate of evaporation of moisture at the edges of gypsum wallboards during the process of drying such boards in a wallboard drier. Due to restriction or decrease of the rate of drying afforded at the edges of the boards being dried, it follows that it is possible to cause substantially uniform drying throughout the entire width of the gypsum wallboards during the process of drying, and accordingly recalcining of the cores at the edges of the boards can be avoided.

The inventions hereof having been fully disclosed, I claim:

1. In a drier for the drying of formed and set gypsum wallboard containing uncombined water, a roller conveyer conveying gypsum board from end to end therethrough in an atmosphere of heated circulating air, the improvement for preventing calcining of side edge portions of the board in the drier and comprising spaced journaled roll means mounted above the roller conveyer, spaced endless belt members mounted on the spaced journaled roll members over the respective paths of the side edges of wallboards as conveyed through the drier and each such belt member extending from the path of a side edge of a wallboard as conveyed through the drier inwardly toward the path of the center thereof, for a distance not exceeding one-quarter of the spacing of the respective side edge paths of a board, and spray nozzles mounted adjacent the endless belt members and directed to spray cooling fluid on the endless belt member.

2. In a drier for the drying of formed and set gypsum wallboard containing uncombined water, a roller conveying gypsum board from end to end therethrough in an atmosphere of heated circulating air, the improvement for preventing calcining of side edge portions of the board in the drier and comprising spaced journaled roll means mounted above the roller conveyer, spaced endless belt members mounted on the spaced journaled roll members over the respective paths of the side edges of wallboards as conveyed through the drier and each such belt member extending from the path of a side edge of a wallboard as conveyed through the drier inwardly toward the path of the center thereof, for a distance not exceeding one-quarter of the spacing of the respective side edge paths of a board, the lower run of the endless belt members adapted to lie substantially in the plane of the top surface of the roller conveyor spaced idler rolls interposed between the spaced journaled rolls and supporting the upper run of the endless belts mounted on such spaced journaled roll means, a roll mounted intermediate the spaced journaled roll means, the axis thereof located above the plane of the lower run of the endless belt means a distance substantially one-half of the diameter of such intermediate roll.

References Cited in the file of this patent

UNITED STATES PATENTS

| | | |
|---|---|---|
| 65,038 | Adamson | May 28, 1867 |
| 1,730,629 | Rule | Oct. 8, 1929 |
| 2,185,087 | Jones | Dec. 26, 1939 |
| 2,452,983 | Birdseye | Nov. 2, 1948 |
| 2,573,355 | Powers et al. | Oct. 30, 1951 |
| 2,712,699 | Fecht | July 12, 1955 |